United States Patent
Song

(10) Patent No.: US 11,930,198 B2
(45) Date of Patent: Mar. 12, 2024

(54) IMAGE PROCESSING METHOD AND APPARATUS, AND RELATED ASSEMBLY

(71) Applicant: INSPUR SUZHOU INTELLIGENT TECHNOLOGY CO., LTD., Jiangsu (CN)

(72) Inventor: Jinfeng Song, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/259,681

(22) PCT Filed: Dec. 30, 2021

(86) PCT No.: PCT/CN2021/143274
§ 371 (c)(1),
(2) Date: Jun. 28, 2023

(87) PCT Pub. No.: WO2023/045168
PCT Pub. Date: Mar. 30, 2023

(65) Prior Publication Data
US 2023/0396786 A1    Dec. 7, 2023

(30) Foreign Application Priority Data

Sep. 22, 2021    (CN) .......................... 202111103935.9

(51) Int. Cl.
*G06K 9/36*    (2006.01)
*H04N 19/124*    (2014.01)
(Continued)

(52) U.S. Cl.
CPC ......... *H04N 19/423* (2014.11); *H04N 19/124* (2014.11); *H04N 19/13* (2014.11);
(Continued)

(58) Field of Classification Search
CPC .... H04N 19/423; H04N 19/124; H04N 19/13; H04N 19/14; H04N 19/176;
(Continued)

(56) References Cited

U.S. PATENT DOCUMENTS 6,473,527 B1    10/2002  Wang
10,205,955 B2 *  2/2019  Muthu .................... H04N 19/44
(Continued)

FOREIGN PATENT DOCUMENTS

CN    105120286 A1    12/2015
CN    105260983 A     1/2016
(Continued)

OTHER PUBLICATIONS

International Search Report and Written Opinion for PCT/CN2021/143274 (dated Jun. 6, 2022).
(Continued)

*Primary Examiner* — Duy M Dang
(74) *Attorney, Agent, or Firm* — Merchant & Gould P.C.

(57) ABSTRACT

Provided is an image processing method, which includes: determining whether the number of written rows of source image data in a DDR is a preset number of rows or a stop write number of rows, the preset number of rows being an integer multiple of the number of rows of an image block determined according to a compression condition, and the image block being any image block in an image block matrix determined on the basis of an entire frame of image; if yes, reading the source image data of the current image block from the DDR on the basis of a first read address of the current image block, the number of rows, and the number of columns; and performing compression on the source image data of the current image block to obtain compressed data, and writing the compressed data to the DDR.

20 Claims, 2 Drawing Sheets

(51) Int. Cl.
*H04N 19/13* (2014.01)
*H04N 19/14* (2014.01)
*H04N 19/176* (2014.01)
*H04N 19/186* (2014.01)
*H04N 19/423* (2014.01)
*H04N 19/625* (2014.01)

(52) U.S. Cl.
CPC ........... *H04N 19/14* (2014.11); *H04N 19/176* (2014.11); *H04N 19/186* (2014.11); *H04N 19/625* (2014.11)

(58) Field of Classification Search
CPC ............... H04N 19/186; H04N 19/625; G06F 16/7864; G06F 13/1694; G06T 9/00; G06T 9/007; G06T 1/20; G09G 5/393; G11C 29/10
USPC .................................................. 382/232, 250
See application file for complete search history.

(56) References Cited

U.S. PATENT DOCUMENTS

| 2007/0016724 | A1* | 1/2007 | Gaither ................. G06F 12/023 711/E12.006 |
| 2009/0177909 | A1* | 7/2009 | Tahara ................. G06F 13/1694 713/400 |
| 2019/0174135 | A1 | 6/2019 | Lin et al. |
| 2021/0149984 | A1* | 5/2021 | Luo ..................... G11C 11/4094 |

FOREIGN PATENT DOCUMENTS

| CN | 106528456 A | 3/2017 |
| CN | 113068040 A | 7/2021 |
| CN | 113421184 A | 9/2021 |
| CN | 113573072 A | 10/2021 |

OTHER PUBLICATIONS

Search Report for Chinese Patent Application No. 20211111039359 (dated Sep. 22, 2021).

* cited by examiner

IMAGE PROCESSING METHOD AND APPARATUS, AND RELATED ASSEMBLY

CROSS-REFERENCE TO RELATED APPLICATION

The present application is a National Stage Application of PCT International Application No. PCT/CN2021/143274, filed on Dec. 30, 2021, which claims priority to Chinese Patent Application No. 202111103935.9, filed with the China National Intellectual Property Administration on Sep. 22, 2021 and entitled "Image Processing Method and Apparatus, and Related Assembly", the disclosure of which is hereby incorporated by reference in its entirety.

TECHNICAL FIELD

The present disclosure relates to the field of image processing, in particular to an image processing method and apparatus, and a related assembly.

BACKGROUND

Digital image processing technology is becoming more and more important in the fields of residential life, industrial production, and aerospace. Due to the large amount of image data, it is necessary to use image compression coding technology to achieve the purpose of transmitting images with high quality at a lower bit rate. The local video images are processed by a Video Graphics Array (VGA) and stored into a unique memory space, a Double Data Rate synchronous dynamic random access memory (DDR), of the VGA. In order to realize the remote transmission of the video images, a Joint Photographic Experts Group (JPEG) compression module reads video source image data from the DDR for image compression, and stores the compressed image data into the DDR, and an Ethernet controller reads the compressed image data from the DDR and transmits same to a remote terminal through Ethernet.

In the related art, the VGA stores the video source image data into the DDR in frames, after the entire frame of video source image data is stored, the JPEG compression module reads the video source image data from the DDR, performs Red Green Blue (RGB) to Luma and Chroma (YUV) format conversion on the entire frame of video source image data, and then performs image compression on the image data after format conversion. When a high-resolution video image is transmitted, the reading and writing of the entire frame of source image data increases the transmission delay, and partitioning of the entire frame of image needs to be implemented in the JPEG compression module, which wastes system resources.

Therefore, how to provide a solution to the above technical problems is a problem to be solved by those skilled in the art at present.

SUMMARY

The present disclosure aims to provide an image processing method and apparatus, an electronic device, and a computer-readable storage medium, which may reduce data transmission delay and reduce system resource waste.

In order to solve the above technical problem, the present disclosure provides an image processing method, which may include the following operations.

It is determined whether the number of written rows of source image data in a DDR is a preset number of rows or a stop write number of rows, the preset number of rows being an integer multiple of the number of rows of an image block determined according to a compression condition, and the image block being any image block in an image block matrix determined on the basis of an entire frame of image.

When the number of written rows of source image data in a DDR is a preset number of rows or a stop write number of rows, the source image data of the current image block is read from the DDR on the basis of a first read address of the current image block, the number of rows, and the number of columns.

Compression is performed on the source image data of the current image block to obtain compressed data, and the compressed data is written into the DDR.

In an embodiment, a process of determining whether the number of written rows of the source image data in the DDR is the preset number of rows includes the following operations.

It is detected whether a current write address in the DDR is a preset address.

when the current write address in the DDR is the preset address, it is determined that the number of written rows of the source image data in the DDR is the preset number of rows.

when the current write address in the DDR is not the preset address, it is determined that the number of written rows of the source image data in the DDR is not the preset number of rows.

In an embodiment, before the source image data of the current image block is read from the DDR of the current image block on the basis of the first read address of the current image block, the number of rows, and the number of columns, the image processing method further includes the following operations.

If the current image block is the image block in the last column of the image block matrix, it is determined whether the number of columns of the source image data in the DDR is the integer multiple of the number of columns of the image block.

If not, column edge processing is performed on the source image data in the DDR.

In an embodiment, the column edge processing includes that: a completion operation is performed on the source image data in the last column of the DDR, so that the number of columns of the source image data is the integer multiple of the number of columns of the image block.

In an embodiment, before the source image data of the current image block is read from the DDR of the current image block on the basis of the first read address of the current image block, the number of rows, and the number of columns, the image processing method further includes the following operations.

If the current image block is the image block in the last row of the image block matrix, it is determined whether the number of rows of the source image data in the DDR is the integer multiple of the number of rows of the image block.

when the number of rows of the source image data in the DDR is the integer multiple of the number of rows of the image block, row edge processing is performed on the source image data in the DDR.

In an embodiment, the row edge processing includes that: a completion operation is performed on the source image data in the last row of the DDR, so that the number of rows of the source image data is the integer multiple of the number of rows of the image block.

In an embodiment, the compression includes an RGB to YUV format conversion operation, a Discrete Cosine Transform (DCT) operation, a quantization operation, and an entropy coding operation.

In order to solve the above technical problem, the present disclosure also provides an image processing apparatus, which includes a determination module, a reading module, and a compression module.

The determination module is configured to determine whether the number of written rows of source image data in a DDR is a preset number of rows or a stop write number of rows, and if yes, generate a first trigger signal, the preset number of rows being an integer multiple of the number of rows of an image block determined according to a compression condition, and the image block being any image block in an image block matrix determined on the basis of an entire frame of image.

The reading module is configured to read, when the first trigger signal is received, the source image data of the current image block from the DDR on the basis of a first read address of the current image block, the number of rows, and the number of columns.

The compression module is configured to perform compression on the source image data of the current image block to obtain compressed data, and write the compressed data to the DDR.

In order to solve the above technical problem, the present disclosure provides an electronic apparatus, which includes a memory and a processor.

The memory is configured to store a computer program.

The processor is configured to implement any one of the steps of the image processing method as described above when executing the computer program.

In order to solve the above technical problem, the present disclosure also provides a computer-readable storage medium, on which a computer program is stored. When executed by a processor, the computer program implements any one of the steps of the image processing method as described above.

According to the image processing method provided by the present disclosure, whenever the source image data written to the DDR reaches the number of rows of the image block corresponding to the compression condition or reaches the stop write number of rows, the source image data in the DDR is read to form the current image block for compression without waiting for the entire frame of source image data to be written to the DDR before processing. Compared with the existing entire frame reading and writing solution, the present disclosure reads and writes less data each time, so as to reduce the data transmission delay. At the same time, the present disclosure completes partitioning of the entire frame of image before compression, so as to reduce the system resource waste. The present disclosure also discloses an image processing apparatus, an electronic device, and a computer-readable storage medium, which have the same beneficial effects as the above image processing method.

BRIEF DESCRIPTION OF THE DRAWINGS

In order to more clearly illustrate the embodiments of the present disclosure, the drawings used in the embodiments will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

The core of the present disclosure is to provide an image processing method and apparatus, an electronic device, and a computer-readable storage medium, which may reduce data transmission delay and reduce system resource waste.

In order to make the objects, technical solutions and advantages of the embodiments of the present disclosure clearer, the technical solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art based on the embodiments of the present disclosure without creative efforts are within the scope of protection of the present disclosure.

Figure 1:
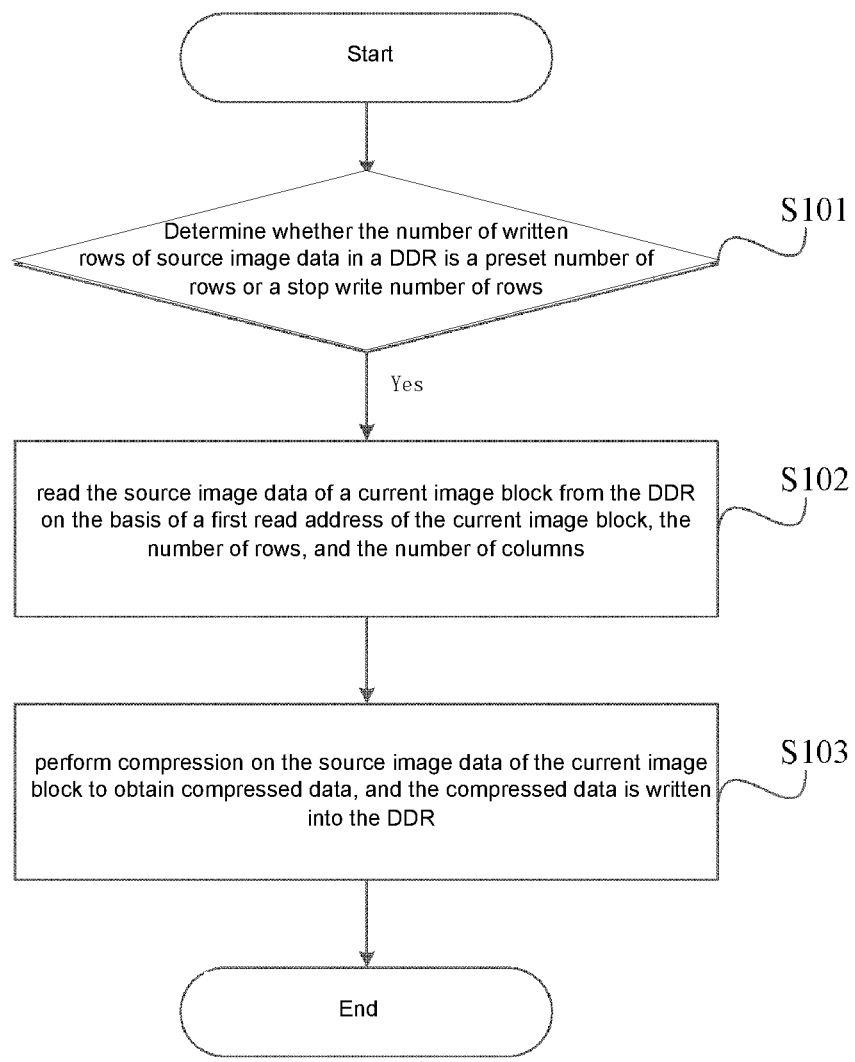
FIG. 1 is a flowchart of an image processing method provided by an embodiment of the present disclosure.

Referring to FIG. 1, which is a flowchart of steps of an image processing method provided by the present disclosure. The image processing method includes the following operations.

At S101, it is determined whether the number of written rows of source image data in a DDR is a preset number of rows or a stop write number of rows, and if yes, S102 is executed. The preset number of rows is an integer multiple of the number of rows of an image block determined according to a compression condition, and the image block is any image block in an image block matrix determined on the basis of an entire frame of image.

In an embodiment, the number of rows and the number of columns of each image block may be determined on the basis of the compression condition, and then the number of rows and the number of columns of the image block matrix may be determined on the basis of the resolution of the entire frame of image. For example, in a DCT-based JPEG compression process, the size of each image block is 8×8, that is, the number of rows and the number of columns of the image block are 8. When the JPEG image data is in an RGB888 format, the data of the image block is 8×8×4 byte. It is understandable that assuming that the resolution of the entire frame of image is 640×480 and the size of the image block is 8×8, the size of the image block matrix is 80×60. Different compression conditions have different requirements for the size of the image block, and the number of rows and the number of columns of the image block matrix may be adjusted accordingly. It is understandable that the number of rows and the number of columns of the source image data stored into the DDR are larger than the number of rows and the number of columns of the image block.

In order to improve the efficiency of image data processing, it is necessary to monitor the source image data written to the DDR by the VGA. Whenever 8 rows of the source image data is fully written, that is, whenever the number of written rows of the source image data in the DDR is the integer multiple of the number of rows of the image block, the source image data in the DDR may be read and processed, so as to avoid the disadvantages caused by storing and processing the entire frame of image. Of course, considering that when the source image data of one frame of image is written in the DDR, the number of rows thereof may not be the integer multiple of the number of rows of the image block, so that when it is determined that all the source image data of the entire frame of image is written to the DDR, it is determined that the stop write number of rows is satisfied. As an exemplary embodiment, a process of determining whether the number of written rows of the source image data in the DDR is the preset number of rows includes the following operations.

It is detected whether a current write address in the DDR is a preset address.

If yes, it is determined that the number of written rows of the source image data in the DDR is the preset number of rows.

If not, it is determined that the number of written rows of the source image data in the DDR is not the preset number of rows.

In an embodiment, it is determined whether an AWADDR write address in the DDR is the preset address through an advanced extensible interface (AXI) main controller, so as to determine whether the number of written rows of the source image data in the DDR is the preset number of rows.

At S102, the source image data of the current image block is read from the DDR on the basis of a first read address of the current image block, the number of rows, and the number of columns.

In an embodiment, when the number of written rows of the source image data in DDR reaches the preset number of rows, it is first determined whether the current image block is the image block in the last row of the image block matrix. If not, the source image data of the current image block is read from the DDR according to the first read address of the current image block and the number of rows and the number of columns of the image block. In this step, partitioning of the entire frame of image is completed to improve the efficiency of image data processing. It is understandable that the first read address of the first image block in the first row and column of the image block matrix is a first address of the entire frame of image, and the first read addresses of other image blocks may be obtained on the basis of the first read address of the first image block, the resolution of the entire frame of image, and a block sequence number.

It is understandable that the preset number of rows refers to the integer multiple of the number of rows of the image block. Taking the 8×8 image block as an example, the preset number of rows is 8, 16, 24, 32 . . . , and so on. 8 rows are fully written during first reading, the source image data read by each image block in the first row of the image block matrix is the source image data in the first to eighth rows of the image block matrix in the DDR, 16 rows are fully written during second reading, the source image data read by each image block in the second row of the image block matrix is the source image data in the ninth to sixteenth rows, and so on.

At S103, compression is performed on the source image data of the current image block to obtain compressed data, and the compressed data is written to the DDR.

In an embodiment, after the source image data of the current image block is obtained, compression is performed on the source image data of the current image block to obtain the compressed data, and the compressed data is written back to the DDR. It is understandable that the source image data and the compressed data are partitioned and stored in the DDR.

In an embodiment, in a DCT-based JPEG compression process, the source image data is compressed, including an RGB to YUV format conversion operation, a DCT operation, a quantization operation, and an entropy coding operation. In an embodiment, RGB to YUV format conversion is performed on the read source image data of the current image block, the data is quantized on the basis of the DCT according to a quantization table, and finally the compressed data is obtained by entropy coding. It is understandable that the present disclosure completes the partitioning of the entire frame of image before JPEG compression of the source image data, which may save JPEG compression resources.

Further, in order to ensure the integrity of data processing, when the source image data of the current image block is read, the source image data may be input into a read First In First Out (FIFO). Since the size of the read source image data is 8×8, the depth of the read FIFO does not need to be very large, which saves some FIFO resources. Accordingly, after the compressed data is obtained on the basis of JPEG compression, the compressed data may also be output to the DDR by a write FIFO.

It may be seen that, in the embodiment, whenever the source image data written to the DDR reaches the number of rows of the image block corresponding to the compression condition or reaches the stop write number of rows, the source image data in the DDR is read to form the current image block for compression without waiting for the entire frame of source image data to be written to the DDR before processing. Compared with the existing entire frame reading and writing solution, the present disclosure reads and writes less data each time, so as to reduce the data transmission delay. At the same time, the present disclosure completes partitioning of the entire frame of image before compression, so as to reduce the system resource waste.

On the basis of the above embodiment:

as an exemplary embodiment, before the source image data of the current image block is read from the DDR on the basis of the first read address of the current image block, the number of rows, and the number of columns, the image processing method further includes the following operations.

If the current image block is the image block in the last column of the image block matrix, it is determined whether the number of columns of the source image data in the DDR is the integer multiple of the number of columns of the image block.

If not, column edge processing is performed on the source image data in the DDR.

As an exemplary embodiment, the column edge processing includes that: a completion operation is performed on the source image data in the last column of the DDR, so that the number of columns of the source image data is the integer multiple of the number of columns of the image block.

As an exemplary embodiment, before the source image data of the current image block is read from the DDR on the basis of the first read address of the current image block, the number of rows, and the number of columns, the image processing method further includes the following operations.

If the current image block is the image block in the last row of the image block matrix, it is determined whether the number of rows of the source image data in the DDR is the integer multiple of the number of rows of the image block.

If not, row edge processing is performed on the source image data in the DDR.

As an exemplary embodiment, the row edge processing includes that: a completion operation is performed on the source image data in the last row of the DDR, so that the number of rows of the source image data is the integer multiple of the number of rows of the image block.

It is understandable that the number of rows and the number of columns of the source image data in the DDR may not be the integer multiple of the number of rows and the number of columns of the image block. Therefore, in order to maintain the visual continuity of the entire frame of image, edge processing needs to be performed on the source image data of the image block in the last column and the image block in the last row of the image block matrix.

In an embodiment, when the preset number of rows of the source image data in the DDR is fully written, that is, a reading condition of a certain row of image blocks in the image block matrix corresponding to the preset number of rows is met. Considering that the number of columns of the source image data in the DDR may not be the integer multiple of the number of columns of the image block, the size of the read source image data does not meet the size of the image block, at this time, column edge processing is performed on the source image data in the DDR, and an edge part is completed by the source image data in the last column in the DDR or by adding 0, so that the read source image data of the last image block in this row meets the compression condition.

Accordingly, if the source image data of the entire frame of image is written to the DDR, then the source image data of each image block in the last row of the image block matrix is read. Considering that the number of rows of the source image data in the DDR may not be the integer multiple of the number of rows of the image block, in order to ensure the visual continuity of the entire frame of image, when it is determined that the number of rows of the source image data in the DDR is not the integer multiple of the number of rows of the image block, row edge processing is performed on the source image data in the DDR, and the edge part is completed by the source image data in the last row in the DDR or by adding 0, so that the read source image data of the image block in the last row meets the compression condition.

Taking the 8×8 image block as an example, a source image data reading solution based on an AXI protocol in the present disclosure is described.

At S201, a system is initialized, it is determined whether the source image data written to the DDR by the VGA has been greater than 8 rows by detecting the AWADDR, and if not, a wait is performed until the data written to the DDR is enough for the image block to read.

At S202, if the source image data written to the DDR is greater than 8 rows, the first read address of the image block in the first row and column of the image block matrix is determined.

At S203, the AXI main controller reads the source image data in the first row of the image block matrix, firstly reads the source image data of the block in the first row and column of the image block matrix, that is, m=0, n=0, and according to a principle of left to right, determines the first read address of the next image block in the first row of the image block matrix, that is, m=0, n++. It is determined whether the next image block is the last image block in the first row. If the next image block is not the last image block in the first row, the AXI main controller reads the source image data from the DDR according to the first read address of the image block. If the next image block is the last image block in the first row, it is determined whether the number of columns of the source image data in the DDR is the integer multiple of 8, if yes, the source image data does not need to be subjected to column edge processing and is directly read, and if not, the source image data needs to be subjected to column edge processing, and the AXI main controller reads the source image data of the last image block in the first row of source image data in the DDR after column edge processing is completed.

At S204, it is determined whether the AWADDR meets the reading condition of the source image data in the next row of the image block matrix, and if not, a wait is performed.

At S205, if the reading condition is satisfied, the first read address of the first image block in the next row of the image block matrix is generated, that is, m++, n=0.

At S206, it is determined whether the current row is the last row of the image block matrix. If this row is not the last row of the image block matrix, the AXI main controller reads the source image data of the first image block in this row, sequentially determines the first read address of the next image block in this row, and determines whether the current image block is the last image block in this row. If the current image block is not the last image block, the AXI main controller sequentially reads the source image data of the next image block in this row from the DDR. If this image block is the last image block in this row, the AXI main controller determines whether the number of columns of the source image data in the DDR is the multiple of 8, if yes, column edge processing is not needed, and if not, column edge processing is performed. The AXI main controller reads the source image data of the last image block in this row after column edge processing is completed. S204 is entered, and the source image data in the next row of the image block matrix is read sequentially.

At S207, if the next row is the last row of the image block matrix, it is determined whether the number of rows of source image data in the DDR is the multiple of 8, if not, row edge processing is performed, and after the processing is completed, the AXI main controller reads the source image data of the first image block in the last row, and then determines the first read address of the next image block. It is determined whether the next image block is the last image block in the last row, if not, the AXI main controller reads the source image data of the current image block. If the next image block is the last image block in the last row, it is determined whether the number of columns of the source image data in the DDR is the multiple of 8. If the image block is the last image block in this row, it is determined whether the number of columns of the source image data in the DDR is the multiple of 8, if yes, column edge processing is not needed, and if not, column edge processing is performed. The AXI main controller reads the source image data of the last image block in this row after column edge processing is completed, and one frame of image is captured.

In summary, the present disclosure does not need to wait for the completion of the entire frame of image of the source image data stored into the DDR by a VGA module. When the stored source image data is greater than the data of one image block, the source image data is read from the DDR, and the source image data capture, and the subsequent format conversion and JPEG image compression are performed by the image block data as a unit. The capture time of the source image data is saved, and the time delay of data transmission is greatly reduced. Moreover, a partitioning unit before JPEG image compression is replaced by a capture method based on an AXI protocol, which saves the system resources.

Figure 2:
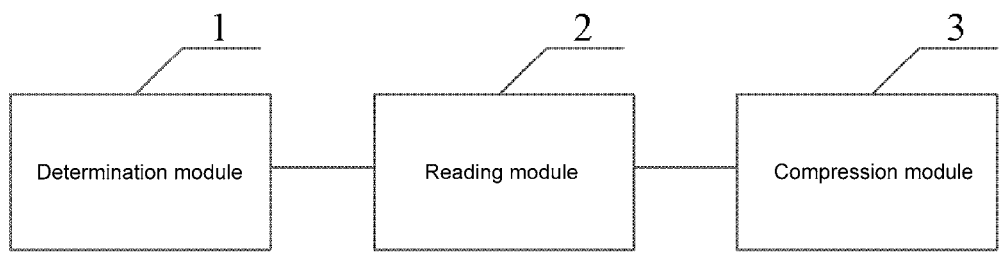
FIG. 2 is a schematic structural diagram of an image processing system provided by an embodiment of the present disclosure.

Referring to FIG. 2, FIG. 2 is a schematic structural diagram of an image processing apparatus provided by the present disclosure. The image processing apparatus includes a determination module 1, a reading module 2, and a compression module 3.

The determination module 1 is configured to determine whether the number of written rows of source image data in a DDR is a preset number of rows or a stop write number of rows, and if yes, generate a first trigger signal, the preset number of rows being an integer multiple of the number of rows of an image block determined according to a compression condition, and the image block being any image block in an image block matrix determined on the basis of an entire frame of image.

The reading module 2 is configured to read, when the first trigger signal is received, the source image data of the current image block from the DDR on the basis of a first read address of the current image block, the number of rows, and the number of columns.

The compression module 3 is configured to perform compression on the source image data of the current image block to obtain compressed data, and write the compressed data to the DDR.

It may be seen that, in the embodiment, whenever the source image data written to the DDR reaches the number of rows of the image block corresponding to the compression condition or reaches the stop write number of rows, the source image data in the DDR is read to form the current image block for compression without waiting for the entire frame of source image data to be written to the DDR before processing. Compared with the existing entire frame reading and writing solution, the present disclosure reads and writes less data each time, so as to reduce the data transmission delay. At the same time, the present disclosure completes partitioning of the entire frame of image before compression, so as to reduce the system resource waste.

As an exemplary embodiment, a process of determining whether the number of written rows of the source image data in the DDR is the preset number of rows includes the following operations.

It is detected whether a current write address in the DDR is a preset address.

If yes, it is determined that the number of written rows of the source image data in the DDR is the preset number of rows.

If not, it is determined that the number of written rows of the source image data in the DDR is not the preset number of rows.

As an exemplary embodiment, the image processing apparatus further includes an edge processing module 4.

The edge processing module 4 is configured to determine, if the current image block is the image block in the last column of the image block matrix, whether the number of columns of the source image data in the DDR is the integer multiple of the number of columns of the image block, and if not, perform column edge processing on the source image data in the DDR.

As an exemplary embodiment, the column edge processing includes that: a completion operation is performed on the source image data in the last column of the DDR, so that the number of columns of the source image data is the integer multiple of the number of columns of the image block.

As an exemplary embodiment, the edge processing module 4 is also configured to determine, if the current image block is the image block in the last row of the image block matrix, whether the number of rows of the source image data in the DDR is the integer multiple of the number of rows of the image block, and if not, perform row edge processing on the source image data in the DDR.

As an exemplary embodiment, the row edge processing includes that: a completion operation is performed on the source image data in the last row of the DDR, so that the number of rows of the source image data is the integer multiple of the number of rows of the image block.

As an exemplary embodiment, the compression includes an RGB to YUV format conversion operation, a DCT operation, a quantization operation, and an entropy coding operation.

Figure 3:
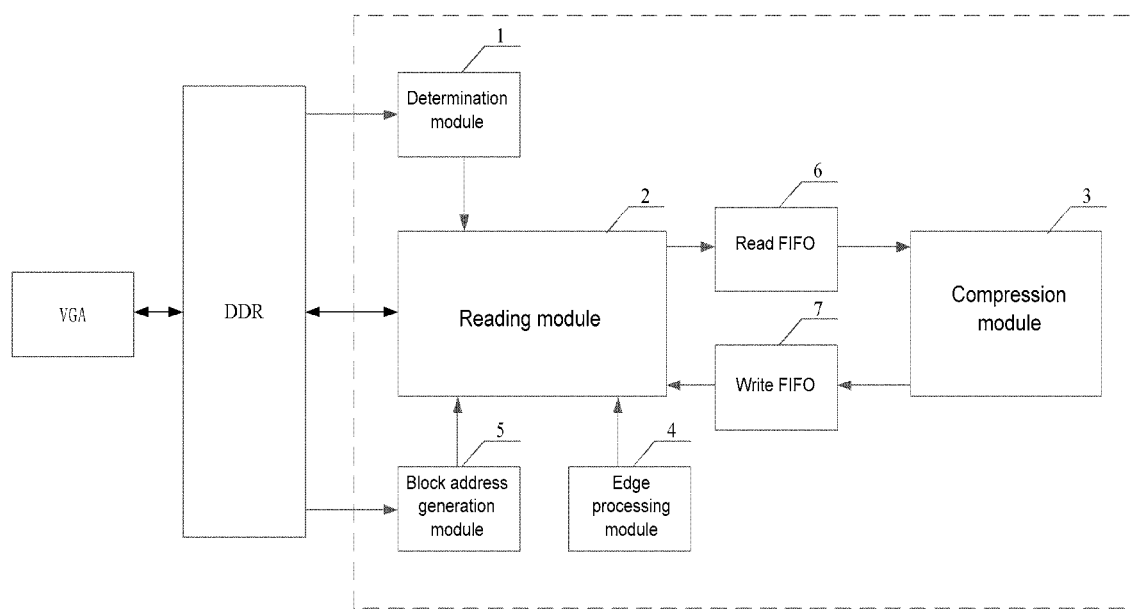
FIG. 3 is a schematic structural diagram of another image processing system provided by an embodiment of the present disclosure.

As an exemplary embodiment, referring to FIG. 3, the image processing apparatus further includes a block address generation module 5, a read FIFO 6, and a write FIFO 7.

The block address generation module 5 is configured to sequentially generate, when the first trigger signal is received, a first address of each image block in the image block matrix.

The read FIFO 6 is configured to transmit the source image data obtained by the reading module 2.

The write FIFO 7 is configured to transfer the compressed data processed by the compression module 3.

In another aspect, the present disclosure also provides an electronic device, which includes a memory and a processor.

The memory is configured to store a computer program.

The processor is configured to implement the steps of the image processing method described in any one of the above embodiments when executing the computer program.

The electronic device provided by the present disclosure has the same beneficial effects as the above image processing method.

The description of the electronic device provided in the present disclosure refers to the above embodiments, which will not be elaborated here.

In another aspect, the present disclosure also provides a computer-readable storage medium, on which a computer program is stored. When executed by a processor, the computer program implements the steps of the image processing method described in any one of the above embodiments.

The computer-readable storage medium provided by the present disclosure has the same beneficial effects as the above image processing method.

The description of the computer-readable storage medium provided in the present disclosure refers to the above method embodiments, which will not be elaborated here.

It is also to be noted that relational terms "first", "second" and the like in the specification are adopted only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The above description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but is within the widest scope consistent with the principles and novel features disclosed herein.

What is claimed is:

1. An image processing method, comprising:
   determining whether a number of written rows of source image data in a Double Data Rate synchronous dynamic random access memory (DDR) is a preset number of rows or a stop write number of rows, the preset number of rows being an integer multiple of a number of rows of an image block determined according to a compression condition, and the image block being any image block in an image block matrix determined on the basis of an entire frame of image;
   when the number of written rows of source image data in the DDR is the preset number of rows or the stop write number of rows, reading the source image data of the current image block from the DDR on the basis of a first read address of the current image block, a number of rows, and a number of columns of the current image block; and
   performing compression on the source image data of the current image block to obtain compressed data, and writing the compressed data into the DDR.

2. The image processing method according to claim 1, wherein a process of determining whether the number of written rows of the source image data in the DDR is the preset number of rows comprises:
   detecting whether a current write address in the DDR is a preset address;
   when the current write address is the preset address, determining that the number of written rows of the source image data in the DDR is the preset number of rows; and
   when the current write address is the preset address, determining that the number of written rows of the source image data in the DDR is not the preset number of rows.

3. The image processing method according to claim 1, wherein before reading the source image data of the current image block from the DDR on the basis of the first read address of the current image block, the number of rows, and the number of columns, the image processing method further comprises:
   when the current image block is a image block in the last column of the image block matrix, determining whether a number of columns of the source image data in the DDR is the integer multiple of the number of columns of the image block; and
   when the number of columns of the source image data in the DDR is not the integer multiple of the number of columns of the image block, performing column edge processing on the source image data in the DDR.

4. The image processing method according to claim 3, wherein the column edge processing comprises: performing a completion operation on the source image data in the last column of the DDR, so that the number of columns of the source image data is the integer multiple of the number of columns of the image block.

5. The image processing method according to claim 1, wherein before reading the source image data of the current image block from the DDR on the basis of the first read address of the current image block, the number of rows, and the number of columns, the image processing method further comprises:
   when the current image block is the image block in the last row of the image block matrix, determining whether a number of rows of the source image data in the DDR is the integer multiple of the number of rows of the image block; and
   when the number of rows of the source image data in the DDR is not the integer multiple of the number of rows of the image block, performing row edge processing on the source image data in the DDR.

6. The image processing method according to claim 5, wherein the row edge processing comprises: performing a completion operation on the source image data in the last row of the DDR, so that the number of rows of the source image data is the integer multiple of the number of rows of the image block.

7. The image processing method according to claim 1, wherein the compression comprises a Red Green Blue (RGB) to Luma and Chroma (YUV) format conversion operation, a Discrete Cosine Transform (DCT) operation, a quantization operation, and an entropy coding operation.

8. The image processing method according to claim 1, wherein the stop write number of rows is a corresponding number of written rows when all the source image data of the entire frame of image is written into the DDR.

9. An electronic apparatus, comprising:
   a memory, configured to store a computer program; and
   a processor, configured to execute the computer program to:
   determine whether a number of written rows of source image data in a Double Data Rate synchronous dynamic random access memory (DDR) is a preset number of rows or a stop write number of rows, the preset number of rows being an integer multiple of a number of rows of an image block determined according to a compression condition, and the image block being any image block in an image block matrix determined on the basis of an entire frame of image;
   when the number of written rows of source image data in the DDR is the preset number of rows or the stop write number of rows, read the source image data of the current image block from the DDR on the basis of a first read address of the current image block, a number of rows, and a number of columns of the current image block; and
   perform compression on the source image data of the current image block to obtain compressed data, and write the compressed data into the DDR.

10. The electronic apparatus according to claim 9, wherein the processor is further configured to:
    detect whether a current write address in the DDR is a preset address;
    when the current write address is the preset address, determine that the number of written rows of the source image data in the DDR is the preset number of rows; and
    when the current write address is the preset address, determine that the number of written rows of the source image data in the DDR is not the preset number of rows.

11. The electronic apparatus according to claim 9, wherein the processor is further configured to:
    when the current image block is a image block in the last column of the image block matrix, determine whether a number of columns of the source image data in the DDR is the integer multiple of the number of columns of the image block; and when the number of columns of the source image data in the DDR is not the integer multiple of the number of columns of the image block, perform column edge processing on the source image data in the DDR.

12. The electronic apparatus according to claim 11, wherein the processor is further configured to:
perform a completion operation on the source image data in the last column of the DDR, so that the number of columns of the source image data is the integer multiple of the number of columns of the image block.

13. The electronic apparatus according to claim 9, wherein the processor is further configured to:
when the current image block is the image block in the last row of the image block matrix, determine whether a number of rows of the source image data in the DDR is the integer multiple of the number of rows of the image block; and
when the number of rows of the source image data in the DDR is not the integer multiple of the number of rows of the image block, perform row edge processing on the source image data in the DDR.

14. The electronic apparatus according to claim 9, wherein the compression comprises a Red Green Blue (RGB) to Luma and Chroma (YUV) format conversion operation, a Discrete Cosine Transform (DCT) operation, a quantization operation, and an entropy coding operation.

15. The electronic apparatus according to claim 9, wherein the stop write number of rows is a corresponding number of written rows when all the source image data of the entire frame of image is written into the DDR.

16. A non-transitory computer-readable storage medium, wherein a computer program is stored on the non-transitory computer-readable storage medium, and the computer program is configured to, when executed by a processor, cause the processor to:
determine whether a number of written rows of source image data in a Double Data Rate synchronous dynamic random access memory (DDR) is a preset number of rows or a stop write number of rows, the preset number of rows being an integer multiple of a number of rows of an image block determined according to a compression condition, and the image block being any image block in an image block matrix determined on the basis of an entire frame of image;
when the number of written rows of source image data in the DDR is the preset number of rows or the stop write number of rows, read the source image data of the current image block from the DDR on the basis of a first read address of the current image block, a number of rows, and a number of columns of the current image block; and
perform compression on the source image data of the current image block to obtain compressed data, and write the compressed data into the DDR.

17. The non-transitory computer-readable storage medium according to claim 16, wherein the computer program is further configured to cause the processor to:
detect whether a current write address in the DDR is a preset address;
when the current write address is the preset address, determine that the number of written rows of the source image data in the DDR is the preset number of rows; and
when the current write address is the preset address, determine that the number of written rows of the source image data in the DDR is not the preset number of rows.

18. The non-transitory computer-readable storage medium according to claim 16, wherein the computer program is further configured to cause the processor to:
when the current image block is a image block in the last column of the image block matrix, determine whether a number of columns of the source image data in the DDR is the integer multiple of the number of columns of the image block; and
when the number of columns of the source image data in the DDR is not the integer multiple of the number of columns of the image block, perform column edge processing on the source image data in the DDR.

19. The non-transitory computer-readable storage medium according to claim 18, wherein the computer program is further configured to cause the processor to:
perform a completion operation on the source image data in the last column of the DDR, so that the number of columns of the source image data is the integer multiple of the number of columns of the image block.

20. The non-transitory The computer-readable storage medium according to claim 16, wherein the computer program is further configured to cause the processor to
when the current image block is the image block in the last row of the image block matrix, determine whether a number of rows of the source image data in the DDR is the integer multiple of the number of rows of the image block; and
when the number of rows of the source image data in the DDR is not the integer multiple of the number of rows of the image block, perform row edge processing on the source image data in the DDR.

* * * * *